United States Patent [19]

Shuman et al.

[11] 3,915,958

[45] Oct. 28, 1975

[54] 6-SUBSTITUTED PURINE NUCLEOTIDES

[75] Inventors: Dennis A. Shuman, Mission Viejo;
Rich B. Meyer, Laguna Beach, both of Calif.

[73] Assignee: ICN Pharmaceuticals Inc., Irvine, Calif.

[22] Filed: May 22, 1972

[21] Appl. No.: 255,804

[52] U.S. Cl............................ 260/211.5 R; 424/180
[51] Int. Cl.²......................................... C07H 19/20
[58] Field of Search ............................ 260/211.5 R

[56] References Cited
UNITED STATES PATENTS

| | | | |
|---|---|---|---|
| 3,317,511 | 5/1967 | Kawashima.................. | 260/211.5 R |
| 3,712,885 | 1/1973 | Weismann et al. .......... | 260/211.5 R |

OTHER PUBLICATIONS
"Chem. and Industry," Fujii et al., Sept. 17, 1966, pp. 1598–1599.

*Primary Examiner*—Johnnie R. Brown
*Attorney, Agent, or Firm*—William E. Thompson; John F. O'Flaherty; Kay H. Boswell

[57] ABSTRACT

A process of synthesizing 6-substituted purine nucleotides is disclosed, as are certain such compounds produced during synthesis which have exhibited the ability to inhibit the enzyme phosphodiesterase, to activate adenosine 3′,5′-cyclic phosphate-dependent protein kinase, and, in one instance, antiviral activity and high cytotoxicity for KB and HeLa Carcinomas. As is apparent from the description which follows, such compounds also serve as intermediates in the described synthesis process.

15 Claims, No Drawings

6-SUBSTITUTED PURINE NUCLEOTIDES

BACKGROUND OF THE INVENTION

As reported by Sutherland et al. in "Cylic AMP," *Am. Rev. Biochem.* 37, 149 (1968), cyclic adenosine monophosphate (C-AMP) has been established as an intracellular "second messenger," mediating many of the actions of a variety of different hormones. According to this theory, first messenger hormones, epinephrine and norepinephrine, influence adenyl cyclase contained at or within cell walls to form intracellularly cyclic AMP from adenosine triphosphate upon receipt of the extra-cellular hormone signal. The formed cyclic AMP in turn functions as a second messenger and stimulates intracellular functions particular to the target cells of the hormone. Cyclic AMP has thus been shown to "activate" protein kinases, which in turn produce physiological effects such as muscle contraction, glycogenolysis, steriodogenisis and lipolysis. A specific example of mediation of steroidogenisis by C-AMP is cellular biosynthesis and excretion of corticosteroids as occasioned by C-AMP formed by adenyl cyclase within the cell walls of the adrenal cortex upon receipt of an extracellular signal carried by the peptide hormone ACTH.

In addition to the foregoing and as representative of the diverse roles played by C-AMP in biological processes can be mentioned implication of C-AMP as a participant in or mediator of the following metabolic reactions or pharmacologic agents: glucagon, vasopressin, lutenizing hormone, thyroid-stimulating hormone, insulin, UDPG-$\alpha$-trans-glucosylase, phosphofructokinase, tryptophan pyrrolase, ketogenesis, amino acid uptake into liver proteins, acetate incorporation into fatty acids and cholesterol of liver, conversion of lactate to glucose (gluconeogenesis), release of amylase, water and ion permeability, sugar transport, acid secretion in the gastric mucosa, platelet aggregation inhibition, catabolite repression, potentiation of antiviral activity of interferon, inhibition of HeLa and strain L cells in culture, and stimulation of antibody production (immunologic mechanism).

The so-called adrenergic effects of many hormones and drugs are also attributed to the intracellular effects of cyclic AMP, whose concentration is controlled by adenyl cyclase and cyclic nucleotide phosphodiesterase. Recent investigations have shown that at least part of the physiological effect of cyclic AMP is a result of the activation of specific protein kinases by cyclic AMP as, for example, in neurotubules isolated from the central nervous system.

As a corollary to the increasing recognition of the role played by cyclic AMP, it has been suggested that it be administered in aid of lagging cellular processes. One example is the report that asthma may be caused by a genetic deficiency of adenyl cyclase. A consequence of such deficiency, of course, is a diminished capacity to intracellularly convert ATP to cyclic adenosine monophosphate.

Cyclic AMP is degraded, however, in vivo by phosphodiesterase enzymes, which catalyze hydrolysis of the cyclic purine nucleotide to 5'-adenosine monophosphate with a consequent loss of function. It has accordingly been suggested that substituted cyclic AMP analogs, which are more resistant to phosphodiesterase degradation than the naturally occurring cyclic nucleotide but which nevertheless retain the biological activity of the naturally occurring nucleotide might be administered in aid of lagging cellular processes. The availability of such C-AMP analogs, for example, could permit maintenance of desired cyclic nucleotide monophosphate levels at dosages reduced from those required with C-AMP itself. Furthermore, the differing specificity of the phosphodiesterase toward cyclic nucleotides of widely varying structure, could enhance the utility of compounds which exhibit different susceptibilities to diesterases of widely varying specificities.

Sutherland et al., in *Circulation* 37, 279 (1968) suggest that the pharmacological effects of theophylline are the result of its ability to inhibit the action of phosphodiesterase enzymes. Theophylline has thus been employed in lieu of the adenyl cyclase-stimulating hormones, epinephrine and norepinephrine, as a heart stimulant following cardiac arrest and in refractory asthma cases as a bronchial dilator. Theophylline, however, does not selectively inhibit phosphodiesterase, but rather gives general stimulation to the central nervous system. Accordingly, the use of theophylline can make the recipient nervous and irritable and can also create cardiovascular effects, i.e., rapid beating. By the same token, theophylline is not as potent a phosphodiesterase inhibitor as is desired and consequently has to be used in larger quantities, which, of course, can further the undesirable effects enumerated above.

From the foregoing, it is clear that it would be advantageous to have cyclic AMP analogs which are resistant to phosphodiesterase degradation and capable of inhibiting phosphodiesterase enzymes, especially on a selective basis, and of activating protein kinase. It would also clearly be desirable to have an efficient and satisfactory process for the synthesis of such compounds.

SUMMARY OF THE INVENTION

This invention provides a process of synthesizing 6-substituted purine nucleotides of the structure:

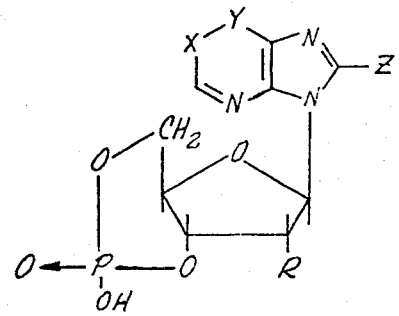

in which X, Y, Z and R are as defined hereinafter, and their physiologically acceptable salts, as for example ammonium, alkali metal or alkyl amine salts. Such compounds are synthesized by alkylation of adenosine 3',5'-cyclic phosphate 1-N-oxide to afford O-alkylated adenosine 3',5'-cyclic phosphate 1-N-oxide, followed by alkaline hydrolysis, nucleophillic displacement and further alkylation. Alternatively, the compounds may be prepared from adenosine 3',5'-cyclic phosphate 1-N-oxide by alkaline hydrolysis, and subsequent nucleophillic displacement and alkylation.

DETAILED DESCRIPTION OF THE INVENTION

The synthesis process of the present invention will be described with reference to the following schematic representation wherein "Rcp" implies β-D-ribofuranosyl-3,5-cyclic phosphate.

branched ($C_1$–$C_8$) phenyl, preferably ($C_1$–$C_4$) phenyl. In a preferred form of the process, compounds 4 and 5 (where $R_1$ and $R_2$ are H) may be prepared directly

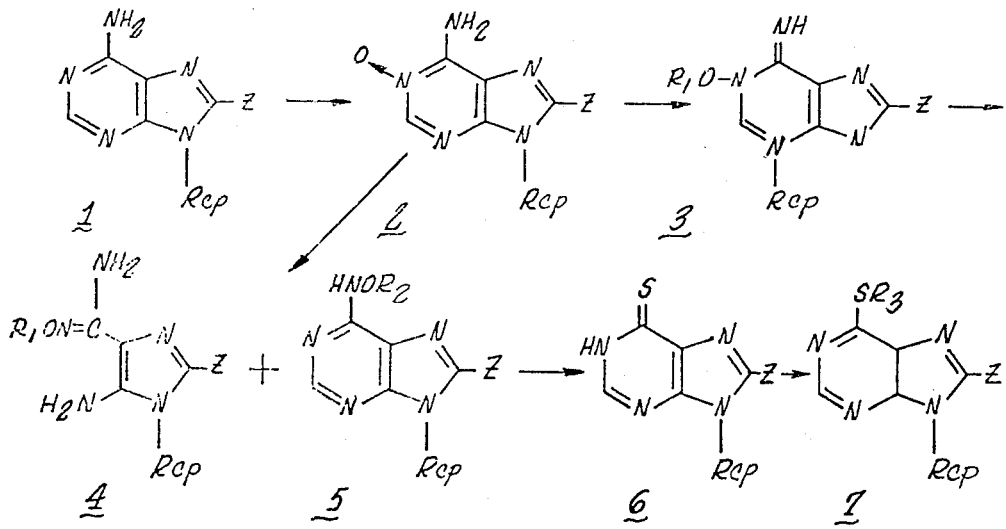

At this point, it should be noted that the process of this invention is generally described in the copending application of Dennis A. Shuman et al., Ser. No. 234,371, filed Mar. 13, 1972, entitled "6-Substituted Purine Nucleotides," as the preferred process of preparing the 6-substituted purine nucleotides claimed therein (Compound 7 in the foregoing schematic representation). Thus, adenosine-3',5'-cyclic phosphate 1-N-oxide (2) may be prepared from cyclic AMP (1) following generally the procedure of T. Pasternak et al., Biochem. Biophys. Acta. 65, 558 (1962), by the action of excess m-chloroperbenzoic acid in sodium acetate. Alkylation of (2) with methyl iodide, yields the corresponding N-methoxide (3); alkylation with other alkyl or aralkyl halides likewise yields the corresponding alkoxides. Alkylation will normally be effected at approximately room temperature in a solvent such as dimethyl sulfoxide (DMSO) and generally from about 30 minutes to about 1 hour will be sufficient time, although more time may be required in cases where Z is a halogen, as for example about 16 to 24 hours. Base-catalyzed hydrolysis of (3) affords a Dimroth rearrangement product (5) as well as N-alkoxy-5-amino-1-β-D-ribofuranosylimidazole-4-carboxamidine 3',5'-cyclic phosphate (4), in ratios varying according to pH. A pH of from about 7 to about 9 optimizes the yield of compound (5), while pH of at least 10, and preferably more strongly alkaline, e.g., a pH of 14, optimizes the yield of compound (4). 9-β-D-Ribofuranosylpurine-6-thione 3',5'-cyclic phosphate (6) is obtained from compound 5 in good yield by subjecting the latter to nucleophillic displacement employing a molar excess of $H_2S$ in aqueous pyridine, as for example a 2:1 volume ratio of $H_2S$ to pyridine, under the conditions reported by Ueda et al., Tetrahedron Letters, 2507 (1971). From this compound, the corresponding 6-alkylated and 6-alkarylated compounds (7) may be obtained in good yield by alkylation with appropriate halides under basic conditions. Thus, methyl iodide affords the 6-methylthio compound, ethyl iodide, the 6-ethylthio, and benzyl bromide the 6-benzylthio substituted compound. Preferably $R_3$ is lower alkyl (e.g. $C_1$–$C_8$), most preferably linear or branched $C_1$–$C_4$. Alternatively, $R_3$ may be lower alkaryl, e.g., linear or from compound 2 by subjecting the latter to alkaline hydrolysis with refluxing NaOH, followed by ion exchange chromatography, as per the procedure of M. A. Stevens et al, J. Am. Chem. Soc., 81, 1734 (1959).

The permissible limits of the various process steps, i.e., N-oxidation, alkylation, hydrolysis, nucleophillic displacement, will vary depending upon factors such as the reagents used, etc., as will be apparent to the art skilled given the description herein and the publications referred to above, which are incorporated by reference herein. For example, with O-alkylated derivatives (Compound 3), base catalyzed hydrolysis will be carried out at room temperature in aqueous NaOH for about 24 to 48 hours to provide a 10:1 product ratio of Compound 4 to Compound 5; refluxing sodium bicarbonate will be used (approximately 45 minutes), as per Fujii et al., Tetrahedron, 27, 2415 (1971), to afford a 1:2.5 ratio of Compound 4 to Compound 5. Cyclic AMP 1-N-oxide (Compound 2) affords a 3:1 ratio of Compound 4 to Compound 5 upon hydrolysis in refluxing NaOH for about 10 minutes.

In the schematic representation set forth above, it will be observed that compounds 1, 2, 5 and 7 have a different arrangement of electrons within the six membered ring than do compounds 3, 4 and 6. This, of course, is due to the substitutions at the 1 position in compounds 3, 4 and 6. In order to provide for this difference, therefore, the generic structure used to depict the novel compounds of this invention is:

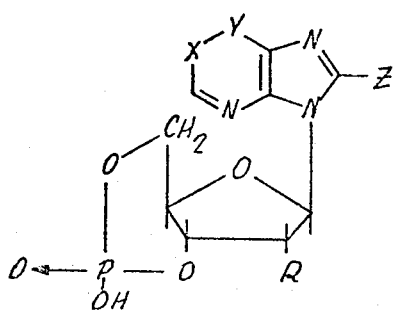

wherein X may be N, N-oxide or $NOR_1$, $R_1$ being alkyl or aralkyl (preferably $C_1$ to $C_8$, more particularly $C_1$ to $C_4$, linear or branched alkyl or phenyl), and Y is >C=NH, C—NH$_2$ or C—NH—OR$_2$ where R$_2$ is H, alkyl or aralkyl (preferably the same as R$_1$ when alkyl or aralkyl). Thus, when X is >NOR$_1$, Y is >C=NH (Compound 3) whereas when X is N oxide, Y will be C—NH$_2$ (Compound 2) and when X is N, Y is C—NH—OR$_2$ (Compound 5). Z in the foregoing structure, is H or halogen (preferably bromine), but when X is N oxide, Z is halogen. R may be H, OH or OR' where R' is $C_1$ to $C_{18}$ acyl.

The invention will be better understood by reference to the following specific but illustrative examples.

EXAMPLE I

Preparation of 8-Bromoadenosine 3',5'-cyclic phosphate - N$^1$-oxide

A mixture of 8-bromoadenosine 3',5'-cyclic phosphate (7g, 17 mmoles), m-chloroperbenzoic acid (12g), ethyl acetate (105 ml), 1M sodium acetate (56 ml) and 1N acetic acid (56 ml) was stirred at warm temperature for 48 hours. The aqueous layer was separated and extracted in 3 × 100 ml ethyl acetate. The aqueous layer was added to a Dowex 50 (H$^+$, 100–200 mesh, 4 × 29 cm) column. The column was washed with water to remove impurities, which were followed by product. Evaporation of the appropriate fractions to a small volume and addition of ethanol gave 8-bromoadenosine 3',5'-cyclic phosphate-N$^1$-oxide (3.37g after drying over P$_2$O$_5$, high vacuum at 78°C for 18 hours). Thin layer chromatography showed a single ultra-violet absorbing spot on Bakerflex cellulose F (acetonitrile: 0.1M ammonium chloride 7:3) and gave a positive ferric chloride test.

Anal. calcd for $C_{10}H_{11}N_5O_7PBr$: C, 28.32; H, 2.61; N, 16.51 Found: C, 28.27; H, 2.94; N, 16.29.

EXAMPLE II

Preparation of 1-Methoxyadenosine 3',5'-cyclic phosphate

Adenosine 3',5'-cyclic phosphate N$^1$-oxide (76.0 g, 0.200 mole) as the dihydrate was dissolved in a solution of 400 ml DMSO and 31 g (0.204 mole) 1,5-diazabicyclo [5.4.0]undec-5-ene. The solution was cooled to 15°, and 40 ml methyl iodide was added with stirring at ambient temp. After 30 min., the mixture had gelled; 1.5 l ethanol was added and the solid was thoroughly homogenized by vigorous stirring. The solid was filtered, and the resulting paste was resuspended in 2 l ethanol and homogenized. The product was again filtered, washed with ethanol and ether, and dried, giving 80.4 g product suitable for further transformation. For analysis, a sample was precipitated from aqueous methanol with ether.

Anal. Calcd for $C_{11}H_{14}N_5O_7P.1/2 H_2O$: C, 35.88; H, 4.11; N, 19.02%. Found: C, 35.88; H, 4.46; N, 18.69%.

EXAMPLE III

Preparation of 1-benzyloxy adenosine 3',5'-cyclic phosphate

To adenosine 3',5'-cyclic phosphate-N$^1$-oxide dihydrate (3.81g, 10 mmoles) dissolved in a solution of 50 ml dimethylsulfoxide and 1,5-diazabicyclo [5.4.0]undec-5-ene (1.52g, 10 mmoles) was added 2.4 ml of benzyl bromide and the resulting solution was stirred at room temperature for two days. The solution was poured into 800 ml acetone and the precipitate filtered and crystallized from water-ethanol to give 1-benzyloxyadenosine 3',5'-cyclic phosphate (2.11g, after drying at 78°C for 12 hr over P$_2$O$_5$ at high vacuum).

Anal. Calcd for $C_{17}H_{18}N_5O_7P.1/4 H_2O$: C, 46.42; H, 4.24; N, 15.92
Found: C, 46.45; H, 4.30; N, 15.68.

EXAMPLE IV

Preparation of 1-Ethoxyadenosine 3',5'-cyclic phosphate

1-Ethoxyadenosine 3',5'-cyclic phosphate was prepared from adenosine 3',5'-cyclic phosphate-N$^1$-oxide and ethyl iodide as in the procedure for 1-benzyladenosine 3',5'-cyclic phosphate. Thin-layer chromatography, ultraviolet spectra, nmr and a negative ferric chloride test confirmed the structure of the product.

Anal. calcd for $C_{17}H_{18}N_5O_7P.H_2O$: C, 36.83; H, 4.63; N, 17.89.
Found: C, 37.05; H, 4.84; N, 17.47.

EXAMPLE V

Preparation of 8-Bromo-1-methoxyadenosine 3',5'-cyclic phosphate

8-Bromo-1-methoxyadenosine 3',5'-cyclic phosphate was prepared from 8-bromoadenosine 3',5'-cyclic phosphate N$^1$-oxide and methyl iodide as in the procedure for 1-benzyloxyadenosine 3',5'-cyclic phosphate. Thin-layer chromatography (Bakerflex cellulose F, acetonitrile: 0.1M ammonium chloride, 7:3) and a negative ferric chloride test were consistent with the structure of the product.

EXAMPLE VI

Preparation of 5-Amino-1-β-D-ribofuranosylimidazole-4-carboxamidoxine 3',5'-cyclic phosphate hydrate (Compound 4) and 6-hydroxylamino-9-β-D-ribofuranosylpurine 3',5'-cyclic phosphate hydrate (Compound 5).

Seventy grams (0.184 mole) of cyclic AMP N$^1$-oxide dihydrate was dissolved in 90 ml 2N NaOH and poured into a refluxing solution of 700 ml 2N NaOH. Refluxing was continued for 10 minutes, and the burgundy colored solution was poured into sufficient ice to bring the temperature to 25°. The pH was adjusted to 10–11 by portion wise addition of Dowex 50 × 8 (H$^+$). The resin was filtered and washed well and the filtrate was passed onto a column (7 × 42 cm) containing 1400 ml Dowex 1 × 2 (formate). The column was washed with 2 l water, then was eluted with a gradient of 4 l water in the mixing chamber and 4 l 0.5N formic acid in the reservoir. The eluate was monitored for absorbance at 254 nm and 24 ml fractions were collected. Compound 4 began to appear after about 5 l of elution solution had passed through. Fractions containing pure Compound 4 were pooled and evaporated to a small volume (<100 ml) in vacuo, and then diluted with 1 lEtOH and chilled. Compound 4 was collected on a filter and washed with EtOH; yield 28.0 g (43%). Anal. Calcd for $C_9H_{14}N_5O_7P.H_2O$: C, 30.60; H, 4.57; N, 19.83%.
Found: C, 30.50; H, 4–41; N, 19.74%.

After all Compound 4 had been eluted, the gradient chambers were filled with 4 l 1.0 N formic acid in the mixing chamber and 4 l 2.0N formic acid in the reservoir. Elution was continued, collecting 24 ml fractions, until Compound 5 began to appear (after about 4 l of eluate had passed). The appropriate fractions containing pure Compound 5 were pooled and evaporated to a small volume, then diluted with 10 volumes of ethanol and chilled. The product was collected on a filter; yield, 8.0 g (12%).

Anal. Calcd for $C_{10}H_{12}N_5O_7P \cdot H_2O$; C, 33.06; H, 3.89; N, 19.28%. Found: C, 33.34; H, 3.73; N, 19.59%.

EXAMPLE VII
Preparation of 5-Amino-N-methoxy-1-β-D-ribofuranosylimidazole-4-carboxamidine 3',5'-cyclic phosphate (Compound 4) and 6-methoxyamino-9-β-D-ribofuranosylpurine 3',5'-cyclic phosphate (Compound 5).

A solution of 30 g $N^1$-methoxyadenosine 3',5'-cyclic phosphate (81.5 mmole), 20 g $NaHCO_3$ (238 mmole), and 300 ml $H_2O$ was refluxed 45 min. The pH of the solution was adjusted to 2.5 with Dowex 50× ($H^+$) while warm, and a water pump vacuum was applied to the mixture to remove $CO_2$. The pH was readjusted to 9–10 with NaOH, and the resin was removed by filtration. The solution was passed onto a column containing 400 ml Dowex 1×2 (formate, 100–200 mesh), and the column was washed well with water. The column was eluted with a gradient of 4 liters water in the mixing chamber and 4 liters 4N formic acid in the reservoir. The first major product, coming after about 2 liters of eluate, was Compound 4, giving 5.4 g (19%) after evaporation of the solvent and trituration of the residue with ethanol. A sample was recrystallized from water for analysis.

Anal. Calcd for $C_{10}H_{16}N_5O_7P$: C, 34.39; H, 4.62; N, 20.05%. Found: C, 34.54; H, 4.70; N, 19.96%.

After approximately 6 liters of eluate, another product began to appear. Evaporation of the appropriate fractions and precipitation of the product from aqueous methanol with ether gave 14.6 g Compound 5 (49%).

Anal. Calcd for $C_{11}H_{14}N_5O_7P \cdot 1/2 H_2O$: C, 35.88; H, 4.11; N, 19.02%. Found: C, 35.64; H, 4.09; N, 18.71.

EXAMPLE VIII
Preparation of 5-Amino-N-ethoxy-1-β-D-ribofuranosylimidazole-4-carboxamidine 3',5'-cyclic phosphate (Compound 4) and 6-Ethoxyamino-9-β-D-ribofuranosylpurine 3',5'-cyclic phosphate (Compound 5).

A solution of 5.5 g 1-ethoxyadenosine 3',5'-cyclic phosphate (14 mmole) and 50 ml 1N NaOH was stirred 20 hr at ambient temperature. The solution was diluted with 450 ml water and passed through a 4 × 16 cm column of Dowex 1 × 2 (formate form, 100–200 mesh) and washed with water. The products were eluted with a gradient of 2 l water in the mixing chamber and 2 l 3N formic acid in the reservoir. Evaporation of the appropriate fractions gave 2.9 g Compound 4 (56%) and 0.28 g Compound 5 (5%).

Anal. Compound 4: Calcd for $C_{11}H_{18}N_5O_7P \cdot 0.5H_2O$; C, 35.49; H, 5.14; N, 18.81%. Found: C, 35.28; H, 4.95; N, 19.10%.

Compound 5: Calcd for $C_{12}H_{16}N_5O_7P \cdot 0.5H_2O$; C, 37.70; H, 4.48; N, 18.32%. Found: C, 37.41; H, 4.48; N, 18.42%.

EXAMPLE IX
Preparation of 9-β-D-Ribofuranosylpurin-6-thione 3',5'-cyclic phosphate.

Hydrogen sulfide gas was conducted into 25 ml pyridine (temp <−60°) until the volume of solution was 75 ml. This solution was added to a frozen solution of 12.0 g (33 mmoles) 6-methoxyamino-9-β-D-ribofuranosylpurine 3',5'-cyclic phosphate and 25 ml water in a steel bomb. The bomb was sealed and kept at 60° for 48 hr. The bomb was cooled, opened and allowed to stand while $H_2S$ evaporated. The resulting mixture was diluted with 100 ml water, filtered, and evaporated. The residue was taken up in 100 ml water, filtered, and applied to a column containing 1000 ml Dowex 50×8 ($H^+$) 100–200 mesh, and the column was eluted with water. Fractions of 24 ml were collected, and 6.30 g product crystallized from the fraction tubes. Evaporation of the fractions still containing product gave 3.45 g additional product; the total yield was 9.75 g (82%).

Anal. Calcd for $C_{10}H_{11}N_4O_6PS \cdot H_2O$: C, 32.97; H, 3.60; N, 15.38%. Found: C, 33.02; H, 3.40; N, 15.40%.

EXAMPLE X
Preparation of 6-Methylthio-9-β-D-ribofuranosylpurine 3',5'-cyclic phosphate (Compound 7).

A solution of 9.1 g (25 mmole) of 9-β-D-ribofuranosylpurin-6-thione 3',5'-cyclic phosphate hydrate and 6.2 g (50 mmole) sodium carbonate hydrate in 25 ml $H_2O$ was diluted with 100 ml methanol and 15 ml methyl iodide. The mixture was stirred 1 hr and evaporated to a small volume, then applied to a column containing 800 ml Dowex 50×8 ($H^+$ form, 100–200 mesh). The column was eluted with water and 23 ml fractions were collected. Impurities were eluted first, and fractions containing pure product were evaporated in vacuo to dryness. The residue was taken up in methanol. Addition of ether gave a white solid which was collected on a filter and dried; yield 8.08 g (85%). A sample was recrystallized from ethanol-water for analysis.

Anal. Calcd for $C_{11}H_{13}N_4O_6PS \cdot 1 1/4 H_2O$: C, 34.51; H, 4.08; N, 14.64%. Found: C, 34.40; H, 3.66; N, 14.53%.

Other 6-alkylated and aralkylated thio derivatives, of course, may be prepared in the same manner as described in Example X, employing appropriate alkyl or aralkyl halides. For more detailed information concerning the same, reference may be made to the previously referenced copending application of Dennis A. Shuman et al., Ser. No. 234,371.

TABLE I

| ULTRAVIOLET SPECTRA OF THE NUCLEOTIDES | | | |
|---|---|---|---|
| | pH | λ (nm) max | $\epsilon \times 10^{-3}$ |
| 1-Methoxyadenosine 3',5'-cyclic phosphate | 1 | 257 | 12.4 |
| | 11 | 257 | 12.5 |
| | | 285(sh) | 3.54 |

TABLE I—Continued

ULTRAVIOLET SPECTRA OF THE NUCLEOTIDES

| | pH | λ (nm) max | $\epsilon \times 10^{-3}$ |
|---|---|---|---|
| 6-Methoxyamino-9-β-D-ribofuranosylpurine 3',5'-cyclic phosphate | 1 | 264 | 15.0 |
| | $H_2O$ | 266 | 13.9 |
| | 11 | 268 | 11.75 |
| 5-Amino-N-methoxy-9-β-D-ribofuranosylimidazol-4-carboxamidine 3',5'-cyclic phosphate | 1 | 281 | 9.63 |
| | $H_2O$ | 258 | 9.49 |
| | 11 | 257 | 10.2 |
| | 11 | 257 | 10.2 |
| 9-β-D-Ribofuranosyl-purin-6-thione 3',5-cyclic phosphate | 1 | 321 | 23.7 |
| | 11 | 310 | 22.2 |
| 6-Methylthio-9-β-D-ribofuranosylpurine 3',5'-cyclic phosphate | 1 | 292 | 16.4 |
| | 11 | 288 | 18.0 |
| 1-Benzyloxyadenosine 3',5'-cyclic phosphate | 1 | 258 | 12.5 |
| | 11 | 257 | 12.6 |
| | | 262(sh) | 11.4 |
| | | 283(sh) | 4.1 |
| 1-Ethoxyadenosine 3',5'-cyclic phosphate | 1 | 257 | 13.0 |
| | 11 | 257 | 13.0 |
| | | 262(sh) | 11.0 |
| | | 285 | |
| 8-Bromo-1-Methoxyadenosine 3',5'-cyclic phosphate | 1 | 263 | |
| | 11 | 262, 287(sh) | |
| 8-Bromoadenosine 3',5'-cyclic phosphate-$N^1$-oxide | 1 | 262 | 13.2 |
| | 11 | 237 | 32.1 |
| | | 263 | 9.2 |
| | | 292 | 2.4 |
| 5-Amino-1-β-D-ribofuranosylimidazole-4-carboxamidoxime 3',5'-cyclic phosphate | 1 | 276 | 8.9 |
| | $H_2O$ | 263 | 8.05 |
| | 11 | 252 | 9.6 |
| 6-Hydroxylamino-9-β-D-ribofuranosylpurine 3',5'-cyclic phosphate | 1 | 263 | 17.1 |
| | $H_2O$ | 265 | 13.6 |
| | 11 | 270 | 9.55 |
| | | 291(sh) | 8.1 |
| 5-Amino-N-ethoxy-1-β-D-ribofuranosylimidazole 4-carboxamidine 3',5'-cyclic phosphate | 1 | 281 | 10.7 |
| | 7,11 | 256 | 11.2 |
| 6-Ethoxyamino-9-β-D-ribofuranosylpurine 3',5'-cyclic phosphate | 1 | 265 | 17.1 |
| | 7 | 267 | 14.7 |
| | 11 | 268 | 13.4 |

EXAMPLE XI

INHIBITION OF PHOSPHODIESTERASE ENZYME

3',5'-cyclic AMP phosphodiesterase (PDE) has been isolated and purified from two different tissues in the following manner. Homogenates of rabbit lung and kidney were made in sucrose-Tris-magnesium buffer and were subjected to centrifugation at low speed to remove nuclei and cell debris. The supernatants were then centrifuged at 105,000x g for 30 minutes. The 105,000x g supernatants were then fractionated using $(NH_4)_2SO_4$. The precipitation which formed at 0–30% saturation was collected by centrifugation at 20,000x g and dissolved in Tris-magnesium buffer and dialyzed overnight against the same buffer. A second $(NH_4)_2SO_4$ fraction was obtained by raising the concentration of the first supernatant to 50%. These two $(NH_4)_2SO_4$ fractions as well as the supernatant from the 30–50% cut were then assayed for PDE activity using the method of Appleman, Biochemistry, 10, 311 (1971). The first fraction obtained from lung and kidney tissues was found to contain a PDE with low affinity for 3',5'-cyclic AMP (high Km). The second fraction was found to exhibit a biphasic curve when the Lineweaver-Burk method of analysis was used. This indicates either the presence of two separate enzymes, one having a high and the other a low affinity for the enzymes, or one protein with two separate sites. Appleman, supra, indicates that extracts of brain yield two separate enzymes (a high Km and a low Km) which can be separated by sepharose gel chromatography.

All of the inhibitory studies reported here were performed with the high affinity (Fraction II, low Km) enzyme obtained from rabbit lung and kidney. $I_{50}$ values were calculated in some instances from a plot of log I vs. percent I in experiments in which inhibitor concentration was varied over a wide range, at a constant 3,5'-cyclic AMP concentration of approximately $1.7 \times 10^{-7}$ M. The relative inhibitory activity of each compound as compared with theophylline is expressed as an $\alpha$ value. This value is obtained by dividing the $I_{50}$ value obtained for the particular compound being evaluated. In most instances $\alpha$ values were calculated from an inhibition study performed with a single concentration of test compound as long as the inhibition produced by that concentration was from 20–80%. In this instance an $\alpha$ value was calculated by dividing the concentration of theophylline giving the same (X%) inhibition concentration of test substance giving x% inhibition.

The validity of this method has been checked by comparing values obtained by (1) measurements at a single concentration of inhibitor and (2) measurements at a single concentration of inhibitor ($I_{50}$ determinations). $\alpha$ values compared in this way have been found to agree to within 10% of each other.

The basic incubation mixture contained the following substances (amounts in $\mu$moles): $^3$H-cAMP (specific activity ~2,180 cmp/pmole), .00016; Tris pH 7.5, 40; $MgCl_2$, 0.5; Enzyme (cAMP phosphodiesterase), 5–50 $\mu$g protein; and $10^{-4}$ to $10^{-6}$ molar concentration of the inhibitor; incubation time 10 minutes at 30°C. At the end of incubation the mixtures are heated to 90°C for 2 minutes and 100 μg of snake venom phosphodiesterase from Crotalus atrox was added and the tubes incubated for 10 minutes at 30°C. The mixture was then cooled and 1 ml of a Dowex 1-2X, 200-400 mesh suspension, prepared by mixing 100 g of the resin in 200 g H₂O, was added and the mixture centrifuged. An aliquot of the supernatant was used to determine counts per minute using a liquid scintillation spectrometer. Zero time values were obtained using incubations in which the cAMP phosphodiesterase was omitted from the first incubation.

TABLE II

INHIBITION OF PHOSPHODIESTERASE ENZYME

| Compound | | | | Inhibitor α | |
|---|---|---|---|---|---|
| R | Z | X | Y | Lung | Kidney |
| OH | H | N | ≧C—NH—OH | — | 3.5 |
| OH | Br | Noxide | ≧C—NH₂ | 0.5 | — |
| OH | H | NO—CH₂C₆H₅ | >C=NH | 4.5 | — |
| OH | H | N | ≧C—NH—OCH₃ | 2.5 | — |
| OH | H | NOCH₃ | >C=NH | 1.7 | — |
| OH | H | NOC₂H₅ | >C=NH | 4.3 | 0.5 |

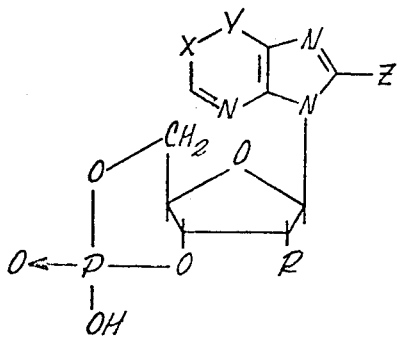

EXAMPLE XII

ACTIVATION OF BOVINE BRAIN PROTEIN KINASE

Cyclic AMP-dependent protein kinase was purified to the stage of DEAE cellulose chromatography from bovine brain using the procedure of Miyamoto et al., *J. Biol. Chem.* 244, 6395 (1969). Protein kinase activity was assayed by measuring the incorporation of $^{32}$P-phosphate into histone from γ-$^{32}$P labeled ATP. The incubation mixture contained (amounts in μmoles): sodium glycerol phosphate buffer, pH 6, 10; γ-$^{32}$P-ATP, ~2 × 10⁶ cpm, 0.001; magnesium acetate, 2; sodium fluoride, 2; EDTA, 0.06,; histone, 40–400 μg; cAMP, cGMP or analog as indicated; purified protein kinase, 5–25 μg in a final volume of 0.2 ml. Activation constants (Ka) were determined according to the procedure of Muneyama et al., supra. The Ka values relative to cyclic AMP (Ka′) are reported in Table III.

TABLE III

ACTIVATION OF PROTEIN KINASE

| Compound | | | | |
|---|---|---|---|---|
| R | Z | X | Y | Ka′ |
| OH | H | N | ≧C—NH—OH | 0.28 |
| OH | Br | Noxide | ≧C=NH₂ | 0.091 |
| OH | H | NOCH₂C₆H₅ | >C=NH | 0.051 |
| OH | H | N | ≧C—NH—OCH₃ | 0.14 |
| OH | H | NOCH₃ | ≧C=NH | 0.008 |
| OH | H | NOC₂H₅ | ≧C=NH | 0.014 |

Ka′ = $\frac{\text{Ka, Cyclic AMP}}{\text{Ka Analog}}$

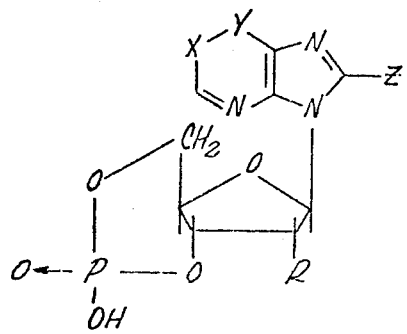

EXAMPLE XIII

RESISTANCE TO PHOSPHODIESTERASE (PDE) DEGRADATION

The cyclic AMP phosphodiesterases used were ammonium sulfate precipitates of 100,000x g supernatants prepared from tissue homogenates of rabbit kidney. The ability of the analogs to serve as substrates for the cAMP phosphodiesterase was measured by the previously described method of Muneyama et al., *Biochem.* 10, 2390 (1971). Inorganic phosphate, released from the 5′-monophosphate formed upon treatment of the analog with PDE was determined colorimetrically. The inorganic phosphate release was effected with nake venom 5′-nucleotidase or E. coli alkaline phosphatase. The basic mixture contained the following (amounts in μmoles): Tris buffer, pH 7.5, 40; magnesium acetate, 25; cAMP or analog, 0.1; enzyme, 100–500 μg in a final volume of 1.0 ml. One unit of activity was defined as that amount of enzyme catalyzing the hydrolysis of 1.0 μmole in 10 minutes at 37°C. Table IV reports rates of analog hydrolysis relative to cyclic AMP (α).

TABLE IV

RESISTANCE TO PHOSPHODIESTERASE DEGRADATION

| Compound | | | | |
|---|---|---|---|---|
| R | Z | X | Y | α |
| OH | H | N | ≧C—NH—OH | 0.41 |
| OH | Br | Noxide | ≧C—NH₂ | 0.04 |
| OH | H | NOCH₂C₆H₅ | >C=NH | 0.34 |
| OH | H | N | ≧C—NH—OCH₃ | 0.24 |
| OH | H | NOCH₃ | >C=NH | 0.18 |
| OH | H | NOC₂H₅ | >C=NH | 0.014 |
| OH | H | N | ≧C—NH—OC₂H₅ | 0.36 |

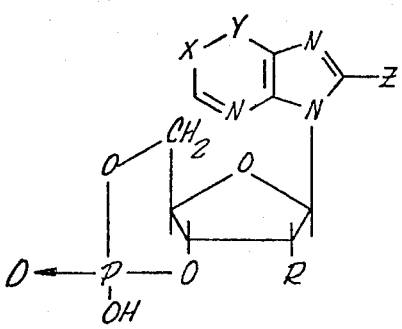

It will be observed from Table II that the compounds of the present invention are effective inhibitors of phosphodiesterase enzyme and in several cases were over three to four times more effective than theophylline and also that the enzyme was selectively inhibited. From Table IV, it will likewise be observed that such compounds are significantly more resistant to degradation by the enzyme.

6-Hydroxylamino-9-β-D-ribofuranosyl purine-3',5'-cyclic phosphate was tested in vitro for antiviral activity according to the virus rating (VR) method of R. W. Sidwell et al., *Appl. Microbiol.* 22, 797 (1971), wherein VR > 1.0 indicates significant antiviral activity, VR of 0.5 to 0.9 indicates moderate antiviral activity, and VR of < 0.5 indicates insignificant antiviral activity. The compound exhibited a VR of 0.6 and 0.7 against Herpes simplex type 1 virus, 0.4 against pseudorabies virus, and 0.4 against myxoma virus.

The same compound was tested in vitro by the method of Sidwell et al, id. for relative cytoxicity against cancer cell. Toxicity was determined by microscopic (200 to 400X) examination, with cell granularity, vaculization, bunching, etc. being indicative of cell destruction resulting from toxicity of the compound. As will be seen from the following Table V, the compound was considerably less toxic against the normal cell than against cancer cells in all cases except the HH (continuous-passaged human heart) cancer cells.

TABLE V

| | Highest Non-Toxic Concentration (μg/ml) | | | |
|---|---|---|---|---|
| KB Cells | RK-13 Cells | HeLa Cells | HH Cells | Vero Cells |
| 3.2 | 32.0 | 0.32 | 0.01 | 3.2 |
| | MDCK Cells | EDtr Cells | L-929 Cells | |
| | 3.2 | 32.0 | 100.0 | |

In light of the foregoing explication of the preferred embodiments of the invention, variations within the spirit and scope thereof will be apparent to those skilled in the art. For example, the cyclic nucleotides of the invention may be employed in the form of their physiologically acceptable salts, e.g., ammonium, alkali metal and alkyl amine salts, obtained by neutralization of the free nucleotide with base appropriate to the desired end. The O-acylated (e.g., $C_1$–$C_{18}$ acyl), analogs may be secured by reaction of the free nucleotides or salts thereof with corresponding acid anhydrides or acyl halides in base. Sutherland et al., *Biochim. et Biophys. Acta* 148, 106 (1967) have demonstrated that acylation of C-AMP enhances cellular transport of purine nucleotides.

We claim:

1. A compound selected from the group consisting of a compound of the structure:

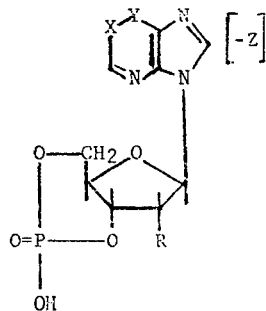

and the physiologically acceptable salts thereof, wherein X is N or $NOR_1$ where $R_1$ is $C_1$ to $C_8$ alkyl or $C_7$ to $C_{10}$ aralkyl; Y is >C=NH or C—NH—$OR_2$ where $R_2$ is $C_1$ to $C_8$ alkyl or $C_7$ to $C_{10}$ aralkyl or H; and R is H, OH or OR' where R' is $C_1$ to $C_6$ acyl; provided that when X is $NOR_1$, Y is >C=NH and when X is N, Y is C—NH—$OR_2$.

2. The compound of claim 1 in which X is N, Y is C—NH—$OR_2$, and R is OH.

3. The compound of claim 2 in which $R_2$ is H.

4. The compound of claim 2 in which $R_2$ is $CH_3$.

5. The compound of claim 2 in which $R_2$ is $C_2H_5$.

6. 6-Hydroxylamino-9-β-D-ribofuranosylpurine 3',5'-cyclic phosphate.

7. 6-Methoxyamino-9-β-D-ribofuranosylpurine 3',5'-cyclic phosphate.

8. 6-Ethoxyamino-9-β-D-ribofuranosylpurine 3',5'-cyclic phosphate.

9. A process of synthesizing 6-substituted purine nucleotides comprising alkylating the $N^1$ oxide function of adenosine 3',5'-cyclic phosphate 1-N-oxide with a compound selected from the group consisting of $C_1$ to $C_8$ alkyl or $C_7$ to $C_{10}$ aralkyl to provide the corresponding O-alkylated adenosine 3',5'-cyclic phosphate 1-N-oxide, subjecting said O-alkylated adenosine 3',5'-cyclic phosphate 1-N-oxide to base catalyzed rearrangement at pH greater than 7 to afford $N^6$-alkoxy adenosine 3',5'-cyclic phosphate, and reacting said $N^6$-alkoxy compound with hydrogen sulfide causing it to undergo nucleophillic displacement to yeild the corresponding 6-thione substituted compound.

10. A process of synthesizing 6-substituted purine nucleotides comprising subjecting adenosine 3',5'-cyclic phosphate-1-N-oxide to base catalyzed rearrangement at pH greater than 7 to afford 6-hydroxylamino-9-β-D-ribofuranoxylpurine 3',5'-cyclic phosphate, and thereafter causing said 6-hydroxylamino derivative to undergo nucleophillic displacement by reacting itt with hydrogen sulfide to yield the corresponding 6-thione substituted compound.

11. The process of claim 9 in which said 6-thione substituted compound is thereafter alkylated to afford 6-alkylthio-9-β-D-ribofuranosylpurine 3',5'-cyclic phosphate, wherein the alkyl group is from $C_1$ to $C_6$.

12. The process of claim 9 in which said base catalyzed rearrangement is carried out in a refluxing solution having a pH of between about 7.0 and 9.0.

13. The process of claim 10 in which said base catalyzed rearrangement is carried out in a solution having a pH of at least 10.

14. The process of claim 9 in which said nucleophillic displacement is carried out in a closed container in the presence of an aqueous solution of pyridine containing a molar excess of hydrogen sulfide with respect to said pyridine.

15. A process of synthesizing 6-substituted purine nucleotides comprising alkylating adenosine 3',5'-cyclic phosphate 1-N-oxide with a compound selected from the group consisting of $C_1$ to $C_8$ alkyl or $C_7$ to $C_{10}$ aralkyl to provide the corresponding O-alkylated adenosine 3',5'-cyclic phosphate 1-N-oxide, subjecting said O-alkylated adenosine 3',5'-cyclic phosphate 1-N-oxide to a refluxing solution having a pH of between about 7.0 and 9.0 at a temperature between 0° and 100°C to cause base catalyzed rearrangement and to afford $N^6$-alkoxy adenosine 3',5'-cyclic phosphate, and reacting said $N^6$-alkoxy compound in a closed container in the presence of an aqueous solution of pyridine containing a molar excess of hydrogen sulfide with respect to said pyridine to cause said $N^6$-alkoxy compound to undergo nucleophillic displacement to yield the corresponding 6-thione substituted compound.

* * * * *